(12) United States Patent
Quintana et al.

(10) Patent No.: US 8,527,550 B1
(45) Date of Patent: *Sep. 3, 2013

(54) BRIDGE INSPECTION DIAGNOSTIC SYSTEM

(75) Inventors: Osiris Quintana, Davie, FL (US); Alexandre Schmidt Dearaujo, Miami, FL (US)

(73) Assignee: Osiris Quintana, Davie, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/364,430

(22) Filed: Feb. 2, 2012

(51) Int. Cl.
*G06F 17/30* (2006.01)

(52) U.S. Cl.
USPC .......................... 707/802; 707/803; 707/804

(58) Field of Classification Search
USPC ................ 707/802, 999.1, 803, 804
See application file for complete search history.

(56) References Cited

U.S. PATENT DOCUMENTS

| | | | |
|---|---|---|---|
| 4,956,999 A | 9/1990 | Bohannan et al. | |
| 5,231,610 A | 7/1993 | Barksdale, Jr. et al. | |
| 5,297,109 A | 3/1994 | Barksdale, Jr. et al. | |
| 5,476,010 A | 12/1995 | Fleming et al. | |
| 5,753,818 A | 5/1998 | Mercado | |
| 6,192,758 B1 | 2/2001 | Huang | |
| 6,260,409 B1 | 7/2001 | Briaud et al. | |
| 7,346,519 B2 * | 3/2008 | Carr et al. | 705/313 |
| 2002/0035408 A1 * | 3/2002 | Smith | 700/97 |

* cited by examiner

*Primary Examiner* — Monica Pyo
(74) *Attorney, Agent, or Firm* — Malin Haley DiMaggio & Bowen, P.A.

(57) ABSTRACT

A Bridge Inspection Diagnostic System ("BIDS") for improving the efficiency and efficacy of the operations of a bridge inspection and management department. BIDS is able to store, automatically index and cross references, and provide access to over the Internet all bridge related data, such as inspection related data, repair related data, and historical background related data that is necessary for the operations of a bridge inspection and maintenance department. This information, which can be uploaded from different locations, including on site at a bridge, and at different times, is automatically sorted by the BIDS engine such that all of such information relating to any bridge is easily accessible when other information for that bridge is accessed.

3 Claims, 10 Drawing Sheets

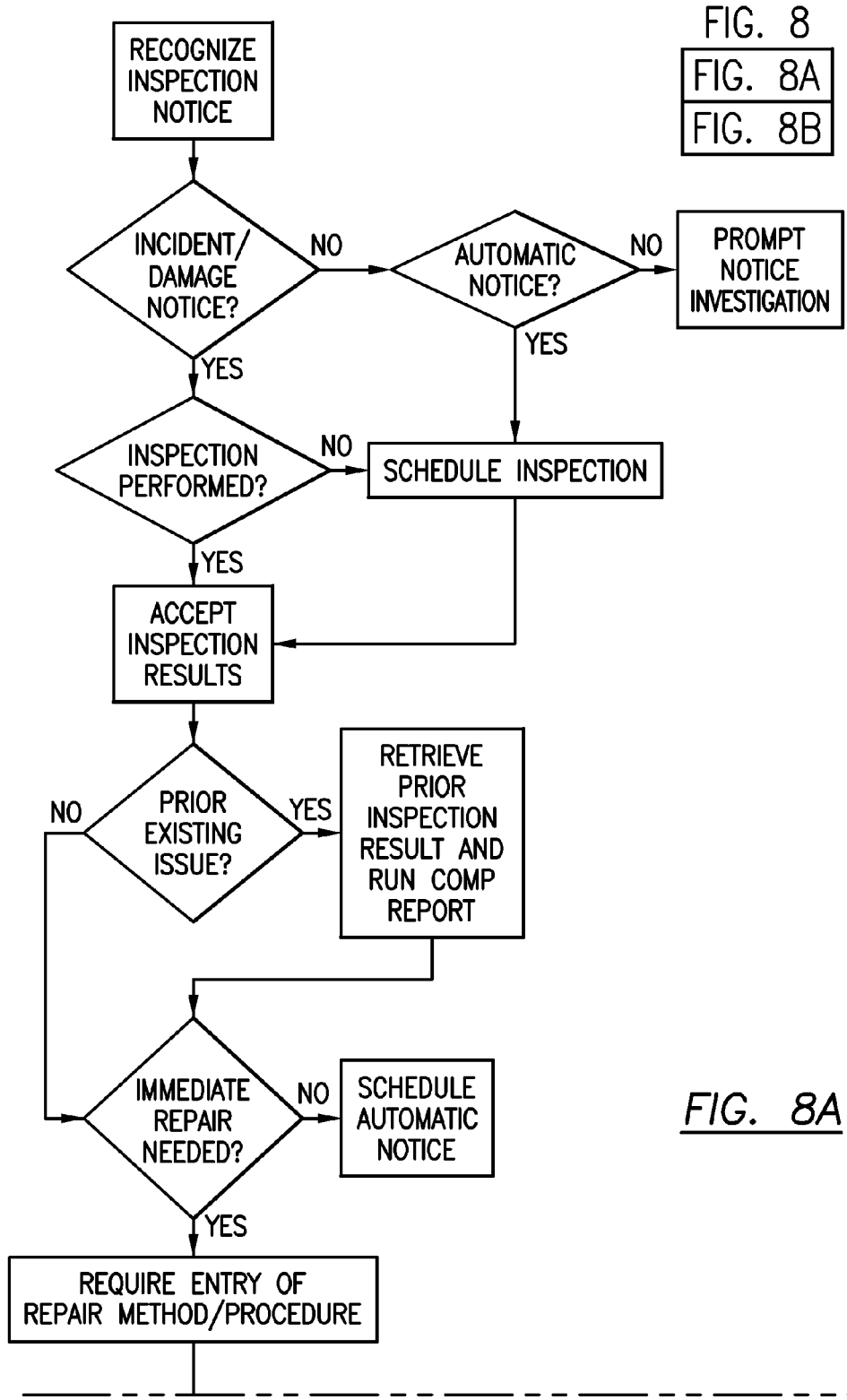

BRIDGE INSPECTION DIAGNOSTIC SYSTEM

BACKGROUND OF THE INVENTION

1. Field of the Invention

This invention relates to a system and method for improving the quality and accuracy of bridge inspections as well as improving the efficiency of field data gathering and field repair efforts with regards to bridge inspection and maintenance.

2. Description of the Prior Art

It is axiomatic that most modern societies rely on the ability to efficiently move people and things across various distances for nearly all undertakings. This reliance has resulted in the development of an immense network of transportation infrastructure improvements, including railways, roads, highways, and bridges. But because these infrastructure improvements inevitably deteriorate over time, there is a perpetual need to inspect, repair, and replace infrastructure improvements in order to maintain this network.

The implementation of various systems and methods to inspect infrastructure improvements is well known. U.S. Pat. No. 4,956,999 issued Sep. 18, 1990 shows methods and apparatus for monitoring structural members subject to transient loads. The methods and apparatus monitor and analyze the frequency characteristics of a structural member vibrating in response to a transient load in order to measure changes in the structural integrity of the member and to classify transient loads by nature and type. U.S. Pat. No. 5,231,610 and U.S. Pat. No. 5,297,109 disclose a piling and pier inspection apparatus and method. The described apparatus and method is for using sonar for determining the nature of one or more scoured underwater bottom areas adjacent to structures submerged in a current of water. U.S. Pat. No. 5,476,010 shows a hands free ultrasonic test view. What is disclosed is a portable ultrasonic inspection apparatus for performing nondestructive testing of engineered materials and structures. U.S. Pat. No. 5,753,818 shows a method and apparatus for measuring scour around bridge foundations. The method and apparatus is useful for measuring scour around bridge foundations and any other structure supported by members that extend into the bottom of a moving body of water. U.S. Pat. No. 6,192,758 structure safety inspection. The described apparatus and method is for determining locations of damage or faults in load bearing structures, such as bridges. U.S. Pat. No. 6,260,409 shows an apparatus and methods for prediction of scour related information in soils. What is disclosed is particularly useful for the measurement and prediction of scour rate in cohesive soils at bridge supports and other structures that obstruct the flow of a body of water. One of the problems with this device is water retention and drainage after the device has been used in the pool.

What is needed is a system administrated over a network of computers that allows the gathering, storing and accessing of information acquired during onsite inspection and repair operations of a bridge by utilizing one or more mobile computing stations in the field. Such a system must automatically organize, sort, and, cross-reference and track all information entered into it such when the information is accessed, whether in real time or at a later time, all potentially related information on the system is simultaneously made available. The use of mobile computing stations is desirable to document or capture certain information concerning a bridge, such as reports and photographs, as well as communicate the information to a host computer system where it is organized and stored. This allows for the creation a permanent visual and documented record of the inspected or repaired bridge and allows issues to be tracked over the years to assure proper follow up on known problem areas and determine the deterioration rate of the bridge. The use of mobile computing stations also allows for subsequent accessing or editing of the bridge information on the host computer system.

SUMMARY OF THE INVENTION

The present invention, known as, a Bridge Inspection Diagnostic System ("BIDS"), provides a new system and method to improve the efficiency and efficacy of the operations of a bridge management department. Notably, BIDS automatically indexes and cross references all bridge related data uploaded to it, such as inspection related data, repair related data, and historical background related data, which is often times uploaded at different times and from different locations so that all of such information relating to any bridge is easily accessible when other information for that bridge is accessed. In addition, BIDS improves the quality and accuracy of field data gathering efforts related to bridge inspections as well as reduces the time required for inspections. Inspection data and some repair data can be gathered using a handheld device that has a camera, keyboard, and internet access so the amount of equipment that an inspector must carry with him is reduced.

BIDS is made up of a core system for bridge inspection and maintenance and additional modulus that will enable other agencies to link and use the core system. It is a web based solution that will allow a bridge inspector, manager, designer, transportation planner or contractor to quickly obtain detailed data of a particular bridge. BIDS is role base software with an administrative engine that will allow a BIDS administrator to assign roles as required for their department therefore controlling the level of access and security assigned to each user. Elements required by National Bridge Inventory ("NBI") are integrated within the systems which allows for quick reference, efficient and accurate inspection of these elements. This same administrative engine allows users to have control of the settings including the use of elements outside those required by the NBI.

BIDS goes step beyond current available software by providing its users with not just bridge inspection reports but additional tools for bridge repair and rehabilitation management, such as the ability to accept contractor as built documents. BIDS tracks every bridge and all discovered deficiencies with separate unique identifier that allows users to track each bridge's or each deficiency's historical record. BIDS' sorting engine automatically cross references the assigned unique identifiers with all other unique identifiers for a particular deficiency and for a particular bridge. Such tracking allows for the creation a comparing report that is helpful in the prioritization of repair and or rehabilitation of the target bridge.

BIDS was developed to improve the quality, reduce inspection time, and accuracy of the field data gathering and repair efforts. Significantly, the web based software solution offered by BIDS provides real time results and includes all pertinent Department of Transportation ("D.O.T.") bridge inspection guidelines and requirements. In one embodiment, BIDS will include all Florida Department of Transportation ("F.D.O.T.") bridge inspection guidelines and requirements and/or Federal Highway Administration guidelines and requirements. Inspection and repair information can be gathered and uploaded on site using a handheld mobile device or laptop with internet access and the inspection and repair process can be tracked along with their respective required timelines and notifications. Thus, BIDS provides for a reduction in the time required for preparing inspections reports in the office, improvements in the quality and quantity of time spent in the field, and improvements in the accuracy of inspection result. Further, the type and amount of equipment that an inspector must carry with him is reduced.

All information gathered in the field is entered into the system for each of the inspection elements along with photographs or video of the element being inspected. From a practical perspective, the system has no preset limits in the number of photos that can be uploaded and thus the taking of photographs to document deficiencies is desirable. The system ensures that the inspector will gather all pertinent information at the time of inspection in order to eliminate revisiting the bridge again if the results of an inspected element are in question. In fact, if a critical deficiency or condition that requires immediate attention from the field is found, an email will be sent to an engineer responsible to the maintenance of the subject bridge with comments and photographs so an requisite action can be taken immediately.

A handheld device that is utilizing BIDS is usually loaded with the Florida Department of Transportation Bridge Inspectors Field Guide Structural Elements. An inspector can therefore have quick access to the field guide when necessary. The handheld device can also be loaded with detail bridge plans and blueprints not in BIDS by using an SD memory card for quick reference of complex structural details. In another embodiment, BIDS permits the use of close-range photogrammetric measurement for structural analysis. This embodiment produces measurements that are accurate, efficient and rapid from a photo, therefore significantly reducing the time required to collect data in the field.

BIDS is equipped with the latest technology required to properly and accurately perform the services required. It allows for efficient use of all field equipment required to maintain bridges, including boats.

It is an object of this invention to provide a bridge maintenance software program with an Internet based interface that improves the efficiency and efficacy of the operations of a bridge management department.

It is another object of this invention to provide a bridge maintenance software program with an Internet based interface that allows the input of data remotely by one or more distinct authorized users.

It is yet another object of this invention to provide a bridge maintenance software program with an Internet based interface that automatically indexes and cross references all data that it contains by the bridge it pertains to.

It is another object of this invention to provide a bridge maintenance software program with an Internet based interface that improves the quality and accuracy of field data gathering efforts related to bridge inspections as well as reduce the time required for inspections.

It is yet another object of this invention to provide a bridge maintenance software program with an Internet based interface that allows the users assigned to repair a subject bridge to not only view data pertinent to the commissioned repair, but also document the repair in real time, including the generation of as built documents, in a manner that is instantly accessible by the party who assigned the repair.

In accordance with these and other objects which will become apparent hereinafter, the instant invention will now be described with particular reference to the accompanying drawings.

BRIEF DESCRIPTION OF THE DRAWINGS

FIG. 8A depicts the repair design process according to the present invention.

DETAILED DESCRIPTION OF THE INVENTION

Figure 1:
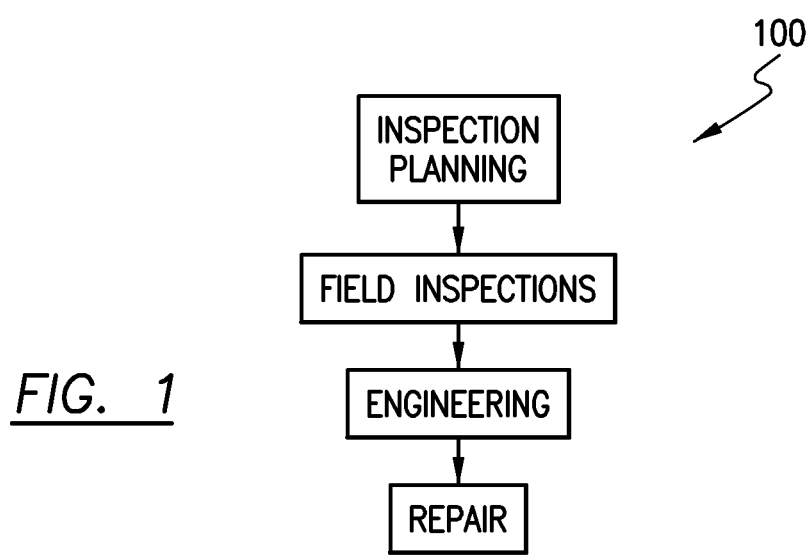
FIG. 1 the process flow of the primary components of a system building in accordance with the present invention.

Referring now to the drawings and in particular FIG. 1, the relationship of the core phases of which BIDS 100 enhances the operation is show. BIDS is initially utilized for inspection planning, where users in the engineering department responsible for maintenance of a bridge ("engineering department officials" or "engineers") access BIDS on a daily basis to receive inspection notifications that concern inspections of a bridge that may be necessary. Such inspection notifications can be an automated notification based on the passage of time or a notification generated in response to a particular incident or damage report. Each inspection notification are automatically assigned a unique identifier and cross referenced with relevant bridge data entries The engineering department officials, typically including a project manager, are able to access all background information about the bridge subject to the inspection notification through BIDS 100 because of the manner in which it has automatically assigned a unique identifier and cross referenced all bridge data that has been uploaded. This background information includes full specifications, plans, inspection history and repair history. With access to said information, the engineering department officials can review the inspection notification in light of all that is documented about the bridge and determine the requisite scope and level of urgency of an inspection. Such a determination facilitates a proper allocation of resources for inspecting the bridge. The project manager (or engineering department officials having such responsibility) then assigns a field inspector to inspect the subject bridge utilizing the same BIDS. Upon such an assignment, the inspection planning phase is complete and the field inspection phase commences.

In the field inspection phase, a field inspector or team of field inspectors access BIDS to receive a listing of bridges scheduled for inspection. After receiving the inspection schedule, the field inspector is able to use BIDS to review and download information concerning what bridges are to be inspected and what structural items are to be evaluated. All of this information is easily accessible through BIDS as relevant entries in the bridge data have all automatically assigned a unique identifier and cross referenced with relevant bridge data entries. The inspector can then use BIDS to upload findings, including any deficiencies found. Such findings are uploaded as inspection report data and are automatically assigned a unique identifier and cross referenced with relevant bridge data and deficiency data entries. While in the field evaluating a bridge, the inspector can utilize a mobile device with a wireless connection to the internet for onsite access BIDS. Access to BIDS while on site would provide the inspector with access to the background information pertaining to the bridge, which may be used to provide a frame of reference for what is observed during the inspection. In addition, the field inspector would be able to immediately upload findings, including any photographs and videos taken using the mobile device. Such photographs and videos are automatically assigned a unique identifier and cross referenced with the pertinent deficiency data entry. Upon the completion of the inspection and upload of the inspection report, the field inspection phase is complete and the engineering phase commences.

In the Engineering phase, engineering department officials access BIDS to obtain the inspection results uploaded by the field inspectors, determine whether any repair is necessary, and design any repairs determined to be necessary. Because BIDS automatically cross references the uploaded inspection results with the existing background information on the pertinent bridge as well as the original notification that mandated the inspection initially by identifier, the engineers have direct access to all relevant information for deciding whether a repair is necessary and detailing any method of repair deemed to be necessary. If the engineers determine that repair is not required, an automatic notification can be entered into BIDS in alternative to commissioning repair of the bridge in whole or in part. Such an automatic notification is assigned a unique identifier and cross referenced to pertinent deficiency entries. BIDS uses such an automatic notification to provide an automatic notification at a later date to flag the bridge for further inspection after the passage of an amount of time is set the engineers. If immediate repair is deemed necessary, a repair detail is created and uploaded. This repair detail is assigned a unique identifier and cross referenced with the pertinent bridge and deficiency entries. A contractor selected to perform the repair can be notified through BIDS and receive its login credentials directly from BIDS. Once the method of repair has been created and uploaded into the system or the engineers are otherwise finished reviewing the inspection results, the engineering phase is complete and the repair phase commences.

In the Repair phase, the selected contractor receives a notification sent by BIDS containing an indication that a repair detail was uploaded. In the notification, the contractor is provided with login credentials for use in accessing BIDS. The contractor accesses BIDS to view the full detail of the commissioned repair, which allows the contractor to pinpoint the location of subject deficiencies with GPS to ensure the correct deficiency is targeted. In addition, due to BIDS' automatic cross referencing all of the background information concerning the bridge to be repaired, the contractor is able to access this information before and during the repair process. The access permissions granted to the contractor are the only limitation as to what information concerning the bridge the contractor can view in BIDS. Before commencing the repair, the contractor may visit the bridge and evaluate the deficiencies scheduled for repair. If such an evaluation is performed, such information, including any photographs can be loaded into BIDS as pre-repair evaluation data, which then automatically assigns a unique identifier, and cross references with relevant bridge and deficiency entries. Then, engineers can review the evaluation data and determine whether the discrepancies exist between the present reality at the bridge and the record from the inspection are significant enough to merit revision. For example, if several months have passed since the field inspection, a deficiency may have significantly worsened or otherwise changed such that the same repair detail may no longer be sufficient for repair. The contractor may upload pictures to document the deficiency as it exists immediately prior to repair using BIDS so that they can be compared side by side with the photograph from the inspection. These photographs are permanently attached the subject pre-repair evaluation entry. If in making the repair the contractor creates as built documents, those documents can be uploaded to BIDS, which in turn automatically assigns a unique identifier, and cross references with relevant bridge and deficiency entries.

Figure 2:
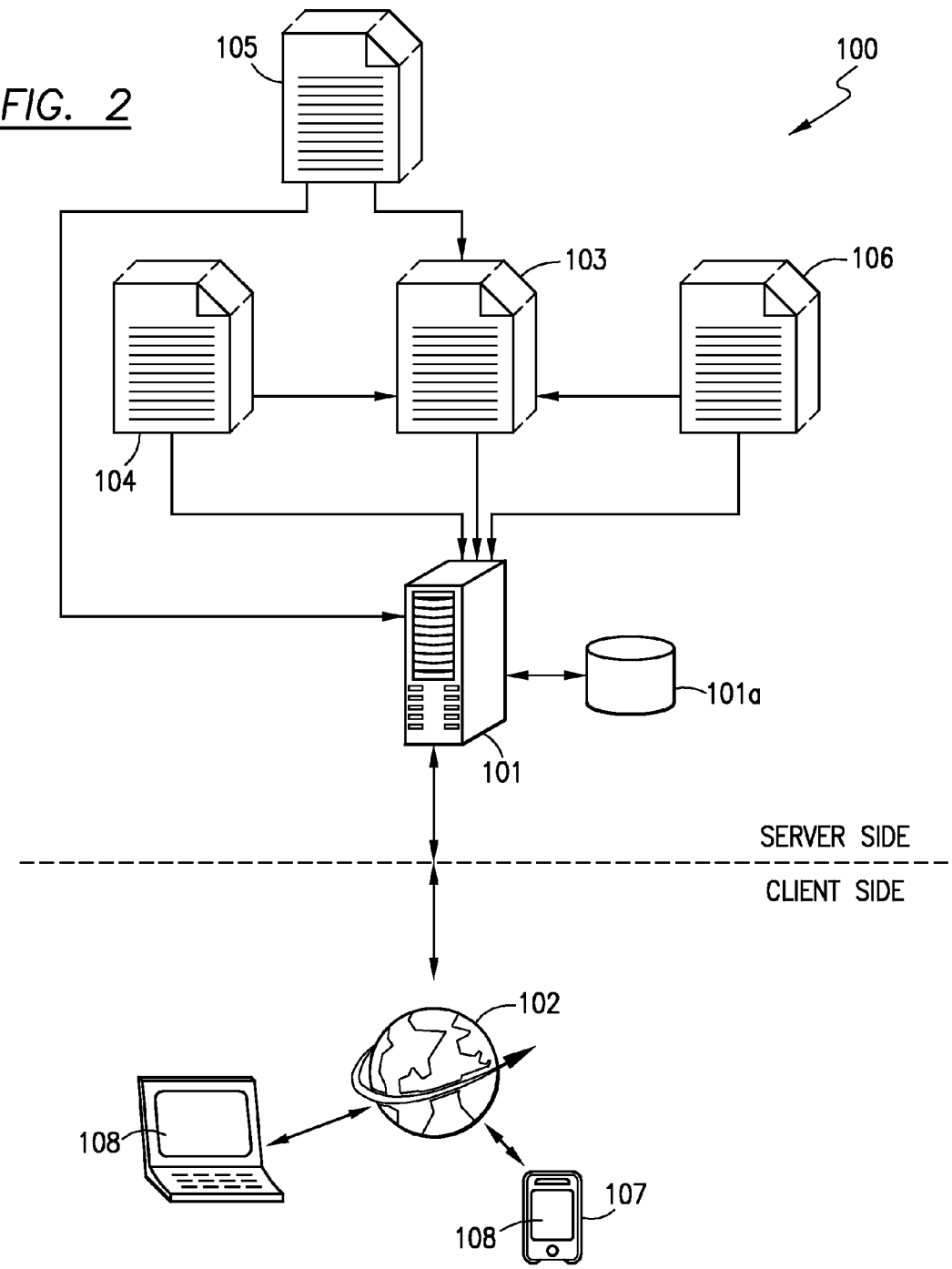
FIG. 2 shows a general process flow according to the present invention.

Referring now to FIG. 2, a system overview of BIDS is shown. BIDS 100 is depicted with server side and client side views. On the server side, a server 101 stores various data on a BIDS database 101*a* to be accessed by system users via the internet 102. The data stored on the BIDS database 101*a* includes inspection data 104, repair data 105 and historical data 106. Each entry in each of these categories have each been assigned a unique identifier so that all data concerning any given bridge in BIDS is stored and can be accessed in a hierarchal manner. This data is categorized in the database 101*a* by type of data under each respecting heading as well as by the bridge it pertains to under bridge data 103. The data stored on the BIDS database 101*a* may be uploaded at a bridge inspection department facility via the internet 102 through system users and/or departmental officials or at any remote location with an internet connection.

System users are depicted on the client side of BIDS 100 overview. Departmental officials may access the BIDS database 101*a* via the internet 102, whether at the department office or through any device with web browsing capability. For example, an inspector in the field may use a field device 107 to access and to upload various data onto the BIDS database 101*a* via the internet 102. Another system user, such as engineers or a repair contractor located who at an offsite office may use a computer to access data on or upload data to the BIDS database 101*a* via the internet 102. The system users access the BIDS database 101*a* on their device by using a graphical user interface 108 that includes various pull down menus and icons for quick access and input. The initial screen on the graphical user interface 108 is a log on screen where a system user inputs user credentials in order to gain access to the BIDS database 101*a* through the server 101. Each system user would have specific database rights and an access profile tied to the user's credentials. A system user's access is limited to specific properties related to that system user and the functions necessary for the user to carry out BIDS activities. Access to the BIDS database 101*a* allows system users to download the bridge data 103, inspection data 104, repair data 105 and historical data 106. Also, the field inspectors may supplement the BIDS database 101*a* with additional photographs and inspection data 104. For ease of access, the bridge data 103 contains the subject bridge's unique identifier an initial or base reference point for each data entry for that bridge, with the unique identifiers from the inspection data 104, repair data 105, and historical data 105 all accessible through the bridge's unique identifier. Essentially, all system users gain access to various data from BIDS in a fairly user-friendly and readily accessible environment.

Figure 3:
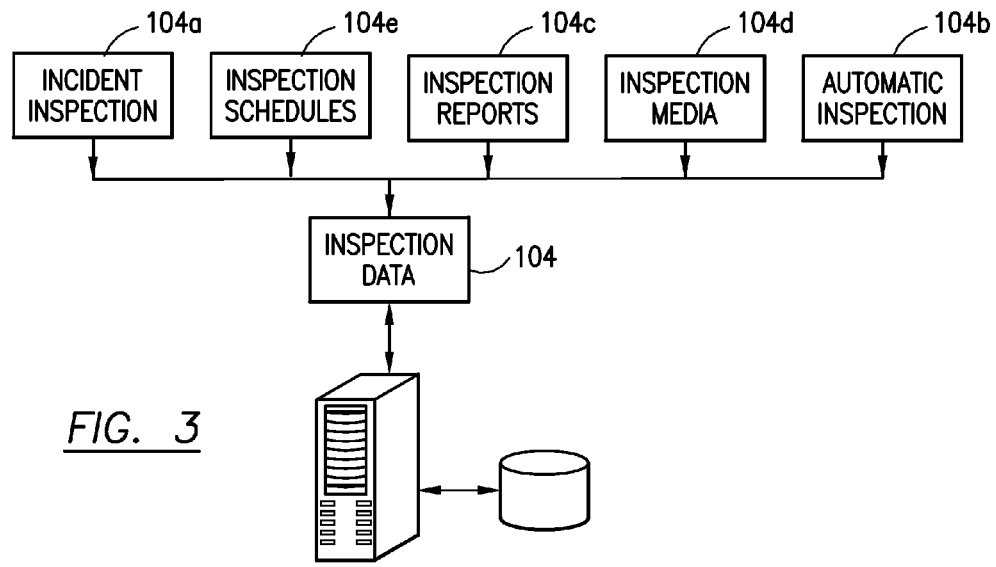
FIG. 3 shows an overview of the data structure organization for inspection related data for a system built in accordance with the present invention.

Referring now to FIG. 3, a more detailed overview of the inspection data portion of the BIDS database 101a is displayed. The inspection data 104 includes incident inspection 104a, automatic inspection 104b, inspection reports 104c, and inspection media 104d. Each entry in each of these categories is automatically assigned a unique identifier, which is permanently linked with the subject bridge's unique identifier. Incident inspection 104a and automatic inspection 104b are flags which pertain to the inspection of bridges. Incident inspections 104a are created and uploaded upon the occurrence of an incident that could potentially have caused damage to the target bridge. When an engineering department officials receive any notifications that any incident such as a weather incident or an automobile accident has potentially caused damage to or otherwise compromised a bridge, the available details of this incident and potential damage are input into BIDS and stored in incident inspections 104a. BIDS uses such an input as a flag to require the scheduling of an inspection.

Automatic inspections 104b are generated by BIDS using information that is available in the BIDS database 101a. For instance, when an inspection at an earlier occasion identifies a deficiency that does not require immediate action but requires ongoing monitoring, BIDS allows an electronic reminder to be saved in inspection data and associated with the pertinent bridge. The electronic reminder can be set to request action in six months, one year, or after any preset period of time. BIDS uses such a reminder to automatically generate a flag after the preset period of time to require the scheduling of an inspection.

When one of these flags is active in BIDS, the engineers with the responsibility of allocating inspection personnel are required to access the incident inspection 104a or automatic inspection 104b and schedule an inspection in order to clear it. While accessing the flag and scheduling an inspection, the engineers will have access to the BIDS database and thus all related bridge documentation, plans and history information to schedule.

Inspection reports 104c and inspection media 104d are the inspection related written documentation and photographic and videographic documentation. When an inspector travels to and inspects a bridge, said inspector is tasked with documenting his findings. Such documentation may include written reports, notes, completed forms, photos, and videos. BIDS permits these findings to be uploaded on site from a mobile device or anytime thereafter once the inspector is able to access the BIDS server via the internet. When an inspection report 104c entry is uploaded to BIDS, the user who is uploading the inspection report 104c entry is forced by BIDS to indicate whether a deficiency report is contained within the inspection report 104c entry. Requiring this indication allows the BIDS system to schedule the next steps that will be necessary to carry out its tracking functions as it relates to deficiencies.

Inspection schedule 104e is the master schedule of bridge inspections as placed in queue by the engineers responsible for scheduling inspections. The bridge inspector or inspectors receive daily notifications of the inspections placed in queue the proceeding day and that was in the queue previously yet remained incomplete. Inspectors have the authority to reassign who performs an inspection, but do not have the authority to cancel inspections presently in the queue or add new inspections to the queue. In performing an inspection, an inspector evaluates the general structural items and reports findings, including any deficiencies. These findings are uploaded to BIDS and sorted into inspection reports 104c and inspection media 104d.

Figure 4:
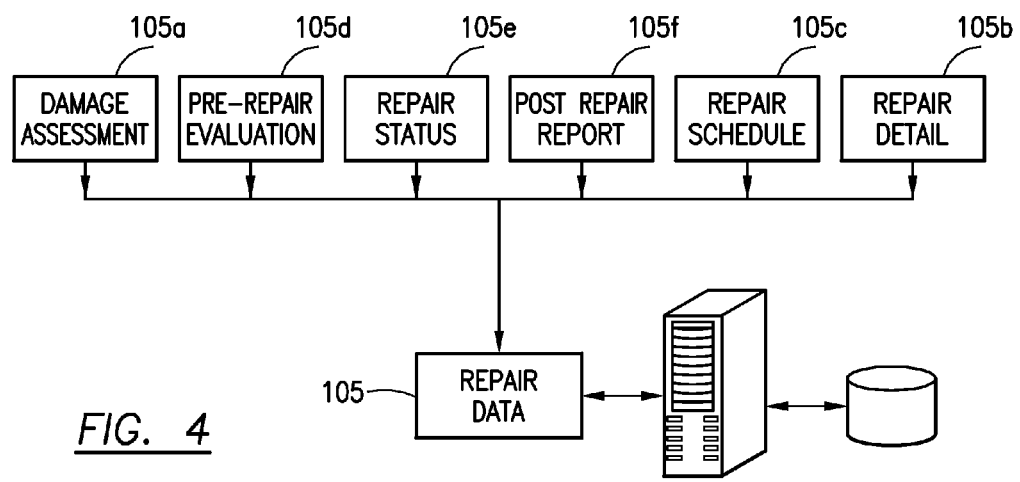
FIG. 4 shows an overview of the data structure organization for repair related data for a system built in accordance with the present invention.

Referring now to FIG. 4, a more detailed overview of the repair data 105 portion of the BIDS database 101a is displayed. The repair data 105 includes damage assessment 105a, repair schedule 105b, repair detail 105c, pre-repair evaluation 105d, repair status 105e, and post repair report 105f. Each entry in each of these categories is automatically assigned a unique identifier, which is permanently linked with the subject bridge's unique identifier. A damage assessment 105a form is created when a deficiency is observed during an inspection and entered into BIDS. The damage assessment 105a form is populated by the engineers upon the review of inspection data 104, assess of the deficiencies identified and determine where immediate repair is required. Upon a new damage assessment 105a being created, BIDS automatically attaches to it a unique identifier that is cross referenced with the entry in the bridge data 103 for the subject bridge. If immediate repair is necessary, a new repair detail 105b entry is created and populated in BIDS by the engineers. When a new repair detail 105b entry is created in BIDS, BIDS automatically assigns a unique identifier that is cross referenced with the entry in the bridge data 103 for the subject bridge. A repair detail 105b entry contains information concerning the method of repair that has been assigned for the subject bridge. In populating a new repair detail 105b, the engineers will review the damage assessment 105a, historical data 106, existing repair data 105, and inspection data 104 for the bridge, all of which are easily accessible because BIDS's automatic cross referencing feature that cross references all bridge data 103 for each bridge. Consequently, the engineers can use the historical data 106, existing repair data 105, and inspection data 104 to ascertain the previous applicable regulations, prior work done, and inspection history of the bridge while preparing the repair detail 105b. A repair detail 105b entry contains the full detail of the repair order, including but not limited to geo-locations for repair, dimensions of the deficiencies, and budget.

The repair schedule 105c is uploaded to or updated in BIDS either at the same time as or after repair detail 105b for the bridges have been uploaded to BIDS. Each entry in the repair schedule 105c is cross referenced with the corresponding repair detail 105b, as well as all bridge data 103 pertaining to the subject bridge. Once an entry is created in the repair schedule 105c for a desired repair to a subject bridge, the selected contractor is notified and provided with the login credentials necessary to access in BIDS the relevant repair schedule 105c entry, as well as all cross referenced bridge data 103 for the subject bridge. Using the login credentials, the contractor can view the repair detail 105c entry and plan its work accordingly.

Prior to commencing the work directed in a repair detail 105c entry, a contractor may visit the bridge and perform an evaluation of the subject bridge. This evaluation is desirable because there is often a time lapse between when an inspection report 104c is created and when the contractor finally receives notification of a repair detail 105c entry. Consequently, the nature of and severity of deficiencies identified in the inspection report 104c and damage assessment 105a may have changed substantively. When BIDS is utilized, this process is substantially streamlined. Accessing BIDS with the login credentials provided when the notification of a repair detail 105c entry was received, the contractor fills out a pre-repair evaluation form that requests information on each previously identified deficiency, either while on site during the evaluation or at a later time. BIDS stores the information from the pre-repair evaluation form to as a pre-repair evaluation 105*d* entry. Each pre-repair evaluation 105*d* entry is automatically given a unique identifier that is cross referenced with the entry in the bridge data 103 for the subject bridge by BIDS. The pre-repair evaluation 105*d* entry may also include photographs of deficiencies, whether previously identified or identified by the contractor at the time of evaluation that can be uploaded and made available in real time. This information can be used by the engineering department officials to potentially revise the repair detail 105*b* to address any deterioration occurring since the inspection report 104*c* entry and damage assessment 105*a* entry for that bridge were created.

While performing repairs pursuant to a repair detail 105*b* entry, a contractor may use its login credentials to access BIDS and enter information deemed by the contractor to be pertinent to the ongoing repair. When this happens, BIDS creates a repair status 105*e* entry for the information entered. Each repair status 105*e* entry is automatically given a unique identifier that is cross referenced with the entry in the bridge data 103 for the subject bridge by BIDS. The repair status 105*e* entry includes the precise GPS coordinates, which assures that the location of the subject deficiency can be pinpointed with GPS and the correct deficiency will be targeted. Upon completion of the repairs to the bridge, the contractor enters the results of the repair into BIDS using the login credentials. When this happens, BIDS creates a post repair report 105*f* entry to store results entered by the contractor. Each post repair report 105*f* entry is automatically given a unique identifier that is cross referenced with the entry in the bridge data 103 for the subject bridge by BIDS. It is desirable for the post repair report 105*f* entry to contain photographs and any descriptions of the repairs complete and repairs that were not completed on the subject bridge as this post repair report 105*f* entry will likely be reviewed while subsequent inspection reports 104*c* and repair details 105*b* are created.

Figure 5:
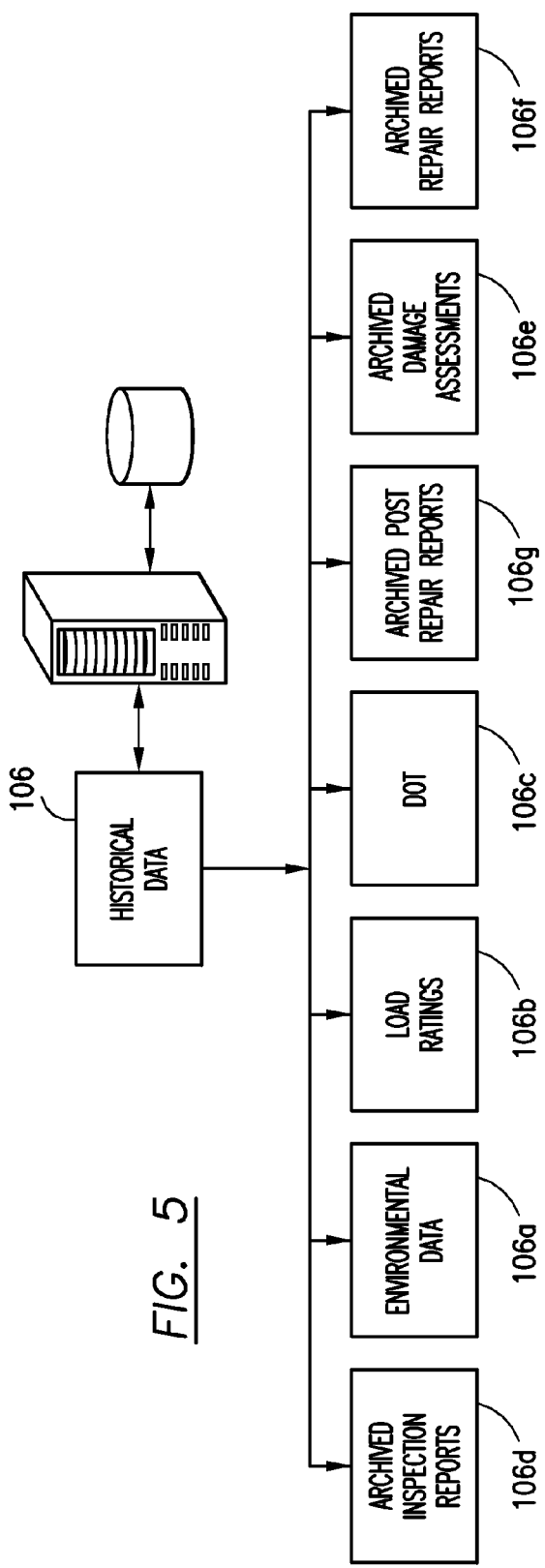
FIG. 5 shows an overview of the data structure organization for historical bridge related data for a system built in accordance with the present invention.

Referring now to FIG. 5, a more detailed overview of the historical data 106 portion of the BIDS database 101*a* is displayed. The each historical data 106 entry consists primarily of past reports pertaining to the subject bridge such as environmental 106*a*, load ratings 106*b*, Department of Transportation ("DOT") reports 106*c*, archived inspection reports 106*d*, archived damage assessments 106*e*, archived repair reports 106*f*, and archived post repair reports 106*g*. Each entry in each of these categories is automatically assigned a unique identifier, which is permanently linked with the subject bridge's unique identifier. The environmental 106*a*, load ratings 106*b*, and Department of Transportation ("DOT") reports 106*c* are typically reports done by or on behalf of regulators. The archived inspection reports 106*d*, archived damage assessments 106*e*, archived repair reports 106*f*, and archived post repair reports 106*g* are typically categorized archived reports from the period prior to the implementation of BIDS by the engineering department officials. All of reports from the Historical Data 106 are manually input into and labeled on the system by the engineering department officials. When they are input and labeled, BIDS automatically assigns a unique identifier to each report and cross references this identifier with the other categories of information for the subject bridge in the bridge data 103.

Figure 6:
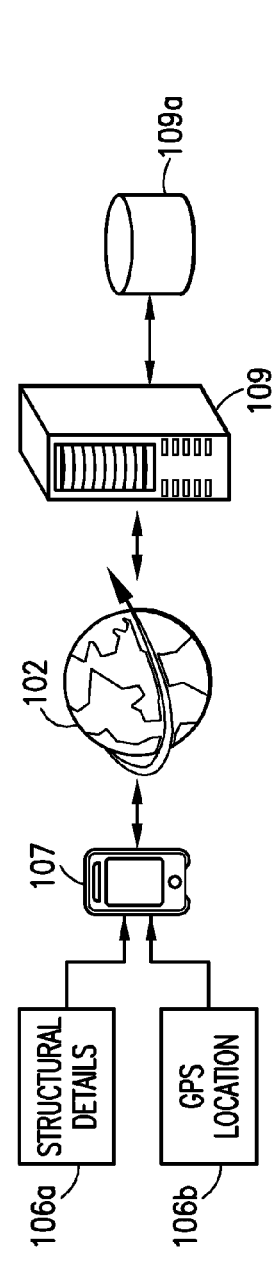
FIG. 6 shows the data flow for data input directly into a pocket PC for onsite use.

Referring now to FIG. 6, the data flow for onsite use of BIDS is shown. A mobile device 107 that is used to access BIDS while on site must be able to access the Internet 102 in order to communicate transmit data to and from the server 109 housing BIDS and BIDS database 109*a*. Such a connection allows the mobile device 107 to access all of the existing bridge data 103 and upload new material that will be organized by BIDS as new bridge data 103. The mobile device 107 access the server through a web browser. The user of the mobile device 107, however, will be forced to provide login credentials prior to being provided with access to bridge data 103. Even after the user's login credentials are accepted, the user will only be allowed to view and edit portions of the bridge data 103 consistent with the permissions that have been assigned to that user. For example, permissions assigned to the engineering department officials will likely be all inclusive as it pertains to any bridge the department is responsible for. Conversely, a bridge inspector tasked with inspecting a bridge will likely have permissions limited to all inspection data 104, post repair reports 105*f*, and all historical data 106*a* pertaining to the bridge being inspected. Similarly, the contractor assigned to perform a repair on a specific bridge would likely only have permissions that allow the contractor to view inspection reports 104*c*, photos 104*d*, all repair data 105 and all historical data 106 for the bridge being repaired.

Certain other data that may be utilized while a user is access BIDS while on site at a bridge is structural details 110*a* and GPS location 110*b*. Structural details 110 are the detailed specifications of a bridge and these are typically loaded into the mobile device using a SD card or other mobile storage device. GPS location 110*b* is available if the mobile device 107 has a built in GPS receiver. If so, this information is typically accessed through the mobile device's built in GPS receiver.

Figure 7:
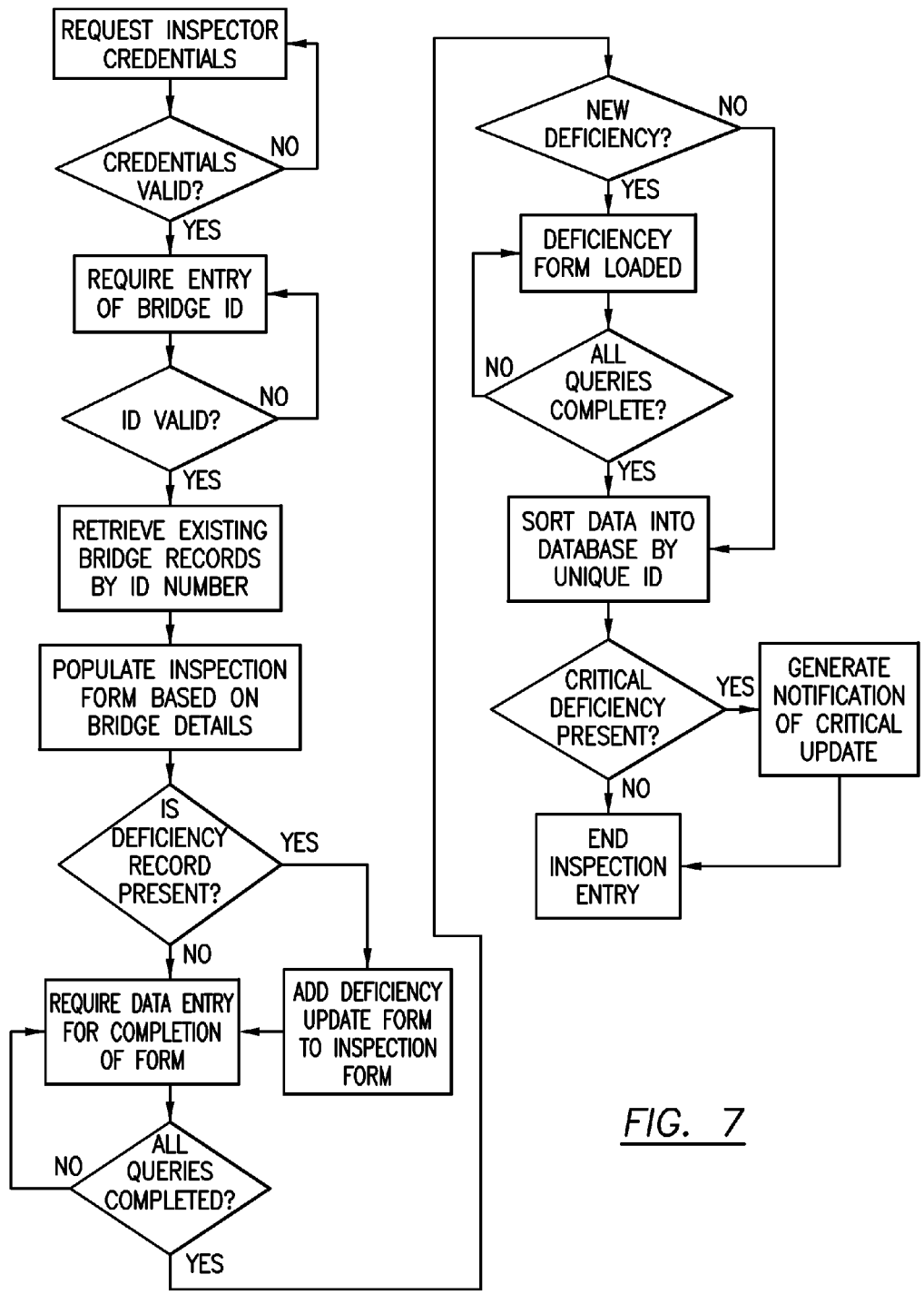
FIG. 7 depicts the inspection process according to the present invention.

Referring now to FIG. 7, when a bridge inspector seeks to utilize BIDS while inspecting a bridge, the inspector will begin by accessing the server that houses BIDS through a web browser on his computer device. Anytime BIDS is accessed through a web browser, it requests valid login credentials be entered before providing access to the BIDS database. If valid login credentials are not provided, BIDS will not let the user proceed until valid login credentials are provided.

Once the inspector accessing BIDS has provided valid login credentials belonging to the inspector, BIDS will automatically recognize the credentials as belonging to an inspector. BIDS then queries the inspector to enter the unique identifier for the bridge being inspected or bridge that is the subject of the inspector access of BIDS. If a valid bridge identifier is entered, BIDS retrieves the bridge data 103 pertaining to that bridge and displays links that allow access to this information. In addition, BIDS load an inspection form and initially populate the form with available information from inspection data 104 and post repair reports 105*f*. If an existing deficiency is present, a deficiency update form is loaded. An existing deficiency may be present if during a prior inspection a deficiency was identified during inspection or repair but deemed to not require immediate attention. This way, BIDS automatically forces a subsequent inspector track existing deficiencies. In addition to text entry, BIDS allows the inspector to uploading photographs of the deficiency. Only once all queries in the inspection form and any added deficiency update form are completed can the inspector move forward in BIDS.

Once the inspector has completed the initial inspection form and any added deficiency update form, BIDS queries the inspector as the whether the inspector has observed any new deficiencies. For the purposes of the inspection process, a new deficiency is a deficiency that does not have a unique identifier attached to it. For example, deficiencies identified at a previous inspection or repair would already have a unique identifier attached, while a prospective deficiency identified in an incident inspection 104*a* entry or automatic inspection 104*b* entry would not. If a new deficiency exists, BIDS loads a deficiency form and requires all queries on the deficiency form be completed. A unique identifier is assigned to the deficiency form. In addition to text entry, BIDS allows the inspector to upload photographs of the deficiency. Once all queries in the deficiency are completed, the process of entering inspection data in BIDS is complete and the BID system automatically sorts the entered data by bridge and deficiency, in applicable, for ease of reference at a later time. If there were no new deficiencies identified, BIDS begins the sorting as soon as all queries are complete from the inspection form.

After sorting, BIDS will analyze the data input from the deficiency update form or the deficiency form for the input of critical deficiencies. If BIDS determines that a critical deficiency has been entered into the system based on data from the deficiency update form or the deficiency form, BIDS will generate a notification of critical deficiency. This notification will notify the engineering department officials that there is an urgent need for repair work. After generating this notification or if no critical deficiency is entered, BIDS ends the inspection entry session.

Figure 8B:
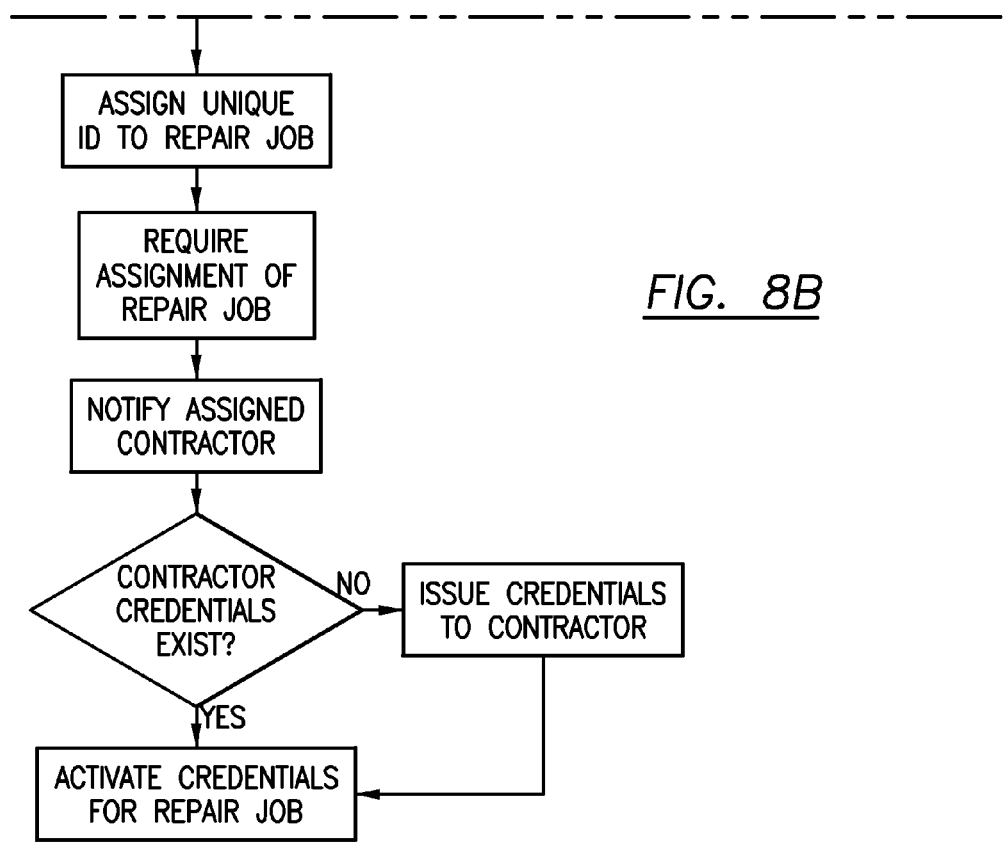
FIG. 8B depicts the repair design process according to the present invention.

Referring now to FIGS. 8A and 8B, a bridge maintenance process that utilizes BIDS commences when the engineering department officials log into BIDS. If an inspection notice has been generated by BIDS since the last login by that user or other personnel from said department, this notice will immediately present itself on the user's screen. If the notice was an incident inspection notice, the user will review the notes from an incident report form and schedule an inspection to be carried out by a bridge inspector. An incident inspection notice will be generated when any BIDS user becomes aware of an incident that could affect the bridge such as a major accident or weather event and as a result fills out an incident report form. If the notice was an automatic notice generated by BIDS, the user will review the last inspection and repair notes and schedule an inspection. Automatic notices typically result from deficiencies that were discovered previously that did not require immediate attention.

Once the engineering department officials receive an indication from BIDS that the scheduled inspection is complete and the results have been uploaded, personnel from the department retrieves and reviews the inspection results. If the inspection report details one or more deficiencies that were existing and previously inspected, the personnel must retrieve the prior inspection report and run a comparison report through BIDS. The comparison report allows a BIDS user to view the deficiencies side by side and observe any progression of the deficiency. If no prior existing issue was present, the engineering department officials must simple review the inspection report, along with the pictures and any designation of a deficiency to determine if repair is necessary at present or within a reasonable amount of time. In the event that the deficiency is deemed to not require repair at present or within a reasonable amount of time, the personnel will simply schedule an automatic notice in BIDS to notify his department in a defined period of time to inspect this deficiency again.

If repair is determined to be required, the engineering department officials will determine and upload the repair detail, which documents the repair method and procedure. BIDS automatically assigns a unique identifier to any uploaded repair detail. Once the repair method is uploaded, BIDS can automatically select a contractor to receive the repair job based on existing schedules, location, and other factors that can be customized. The engineering department officials can confirm this choice or select and confirm a different contractor. Once the contractor is confirmed, BIDS automatically notifies the contractor. BIDS also determines is the contractor has been issued login credentials to BIDS in the past. If so, BIDS will activate those credentials for the presently assigned job, allowing the contractor to immediately access relevant bridge data 103 for the bridge to be worked on. If not, BIDS will issue new credentials and activate those credentials for the job, again allowing the contractor to immediately access relevant bridge data 103 for the bridge to be worked on. Once the credentials are active, BIDS automatically transmits an electronic notification to the contractor instructing the contractor to access BIDS to commence work on the assigned repair job, providing the repair method unique identification, and providing the login credentials to the contractor.

Figure 9:
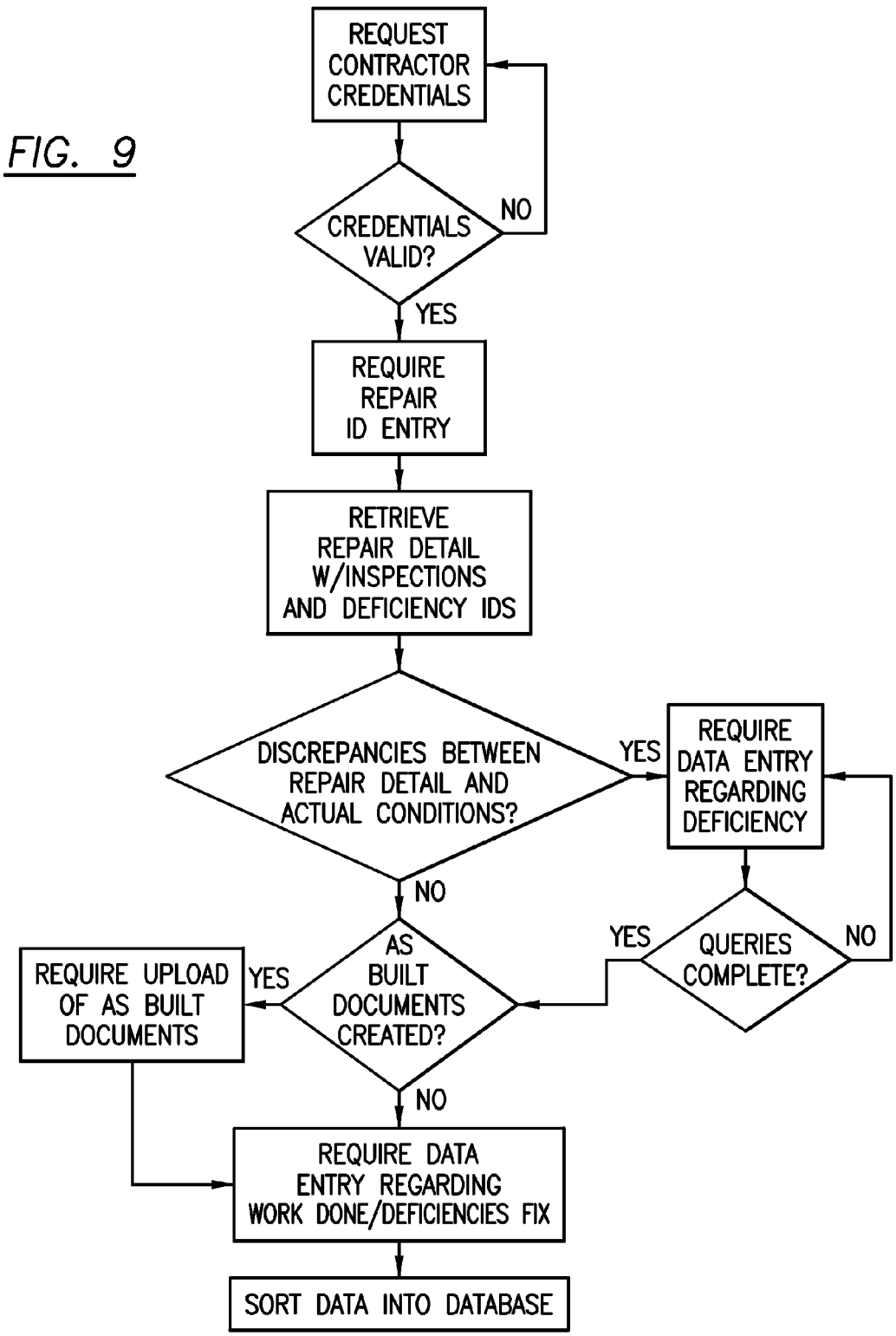
FIG. 9 depicts the repair process according to the present invention.

Referring now to FIG. 9, when a contractor seeks to access BIDS to begin a repair job, the contractor begins by accessing BIDS over the Internet through a web browser. The contractor will be prompted to enter its login credentials. If the login credentials entered are not valid, the system will not let the contractor proceed and will continue to request login credentials. Once valid credentials are entered, BIDS requires the contractor to enter the repair detail identifier so that BIDS can retrieve the repair detail and all other pertinent bridge data for the repair. After receiving this material, BIDS requires the contractor to visit the bridge and report any discrepancies in the repair detail from the actual conditions on the bridge. If the contractor reports discrepancies, BIDS requires the entry of details concerning the discrepancy. BIDS allows the uploading of images as well as text for this task. Entering discrepancy details also causes BIDS to automatically notify the engineering department officials that created the repair detail. Once all queries are complete concerning the discrepancy or if no discrepancy is reported, BIDS queries the contractor concerning whether the contractor has or will create as built documents. If so, the contractor will be required to upload them and will permanently associate the as built documents with the repair detail identifier. In some cases, the engineering department officials may require review and approval of the discrepancy report or any as built documents before the contractor can move forward with the repair.

Once the repairs are complete, the contractor is required to upload post repair details into BIDS to detail exactly what work was done, what were the results, and any other information that is to be documented concerning the repair. BIDS assigns a unique identifier to the post repair detail and corresponds this with all of the bridge data for the subject bridge.

Figure 10:
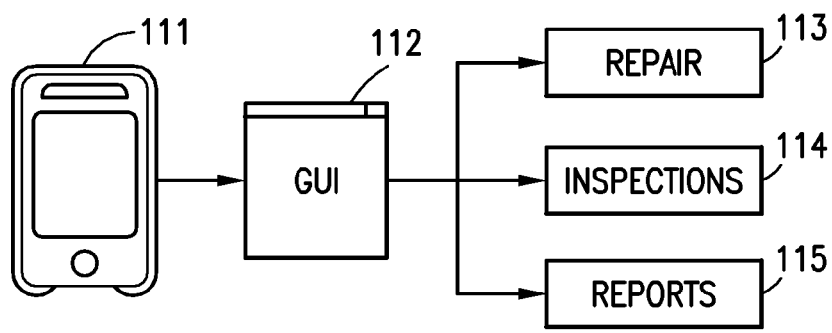
FIG. 10 depicts an overview of end user templates according to the present invention.

Referring now to FIG. 10, an overview of the user connection to BIDS is shown. A user may use a mobile device 111 or a desktop, tablet or laptop computer with access to the Internet to access BIDS via a client like a web browser. Once logged onto the system, the user views a graphical user interface (GUI) 112 in order to log into the system and then may retrieve or submit data into the system. The GUI 112 is capable of displaying all bridge data, including any repair data 113, inspection data 114, and historical data 115 that may be available. The graphical interface accordingly includes pull down menus and shortcut icons associated with the various databases and functions that are available in BIDS.

Figure 11:
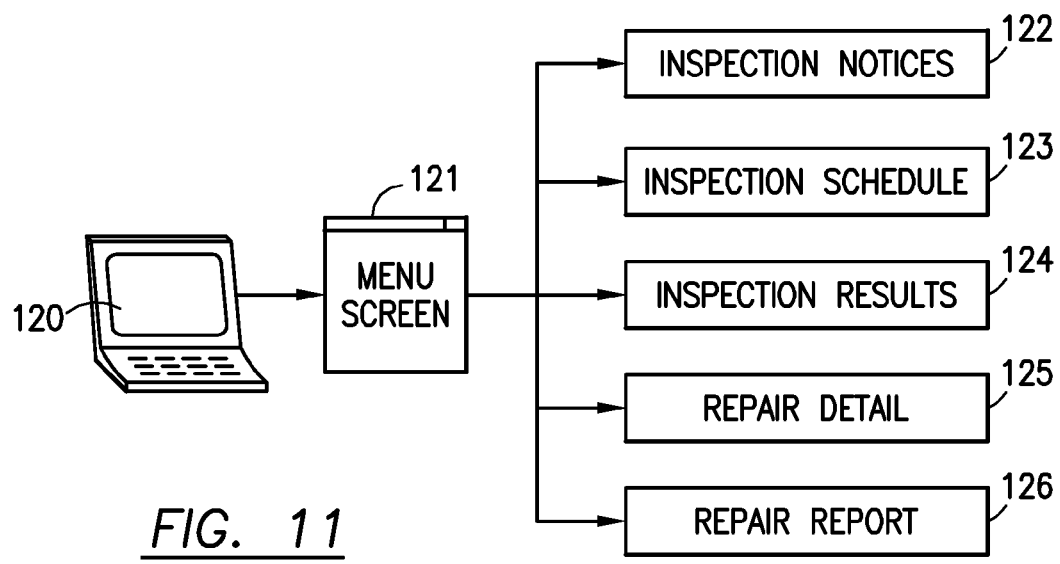
FIG. 11 depicts an exemplary engineer user interface on a pocket PC accessing the present invention.

Referring now to FIG. 11, an overview of the primary menus typically available to an engineering department officials is shown. Engineering department officials typically accesses BIDS on a computer 120 at a department office. The menu screen 121 after valid login credentials are provided will have direct links to inspection notices 122, inspections schedules 123, inspection results 124, repair details 125, and repair reports 126. This user would typically have the most unrestricted access to the BIDS database in order to allow the user to effectively administrate the activity of the other BIDS users. These primary menus, however, are customizable by a system administrator depending on the needs and wants of the department.

Figure 12:
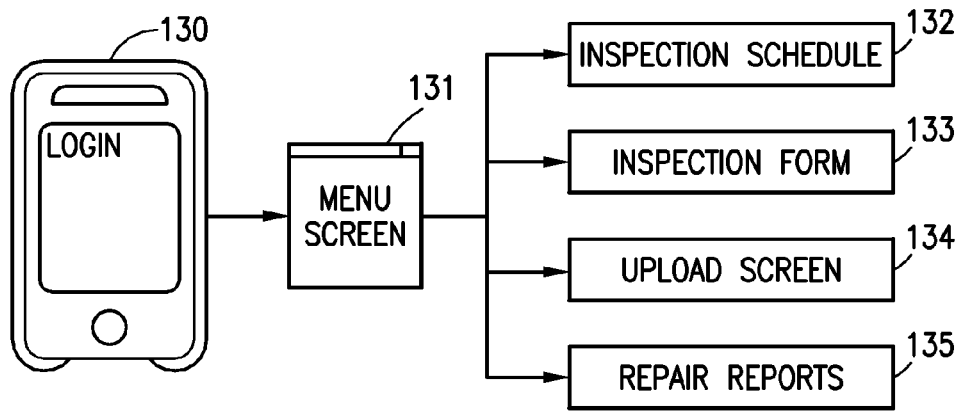
FIG. 12 depicts an exemplary inspector user interface on a pocket PC accessing the present invention.

Referring now to FIG. 12, an overview of the primary menus available typically available to an inspector upon logging in to BIDS is shown. An inspector often accesses BIDS onsite though a mobile device 130. The menu screen 131 after valid login credentials are provided will have direct links to inspections schedules 132, inspection forms 133, an upload screen 134, and repair reports 135. The upload screen 134 menu is provided for ease of access because the inspector is often time on site and thus expected to upload as many photographs as possible into BIDS. This user would typically have more restricted access permission to BIDS. As stated above, the primary menus are customizable by a system administrator depending on the needs and wants of the department.

Figure 13:
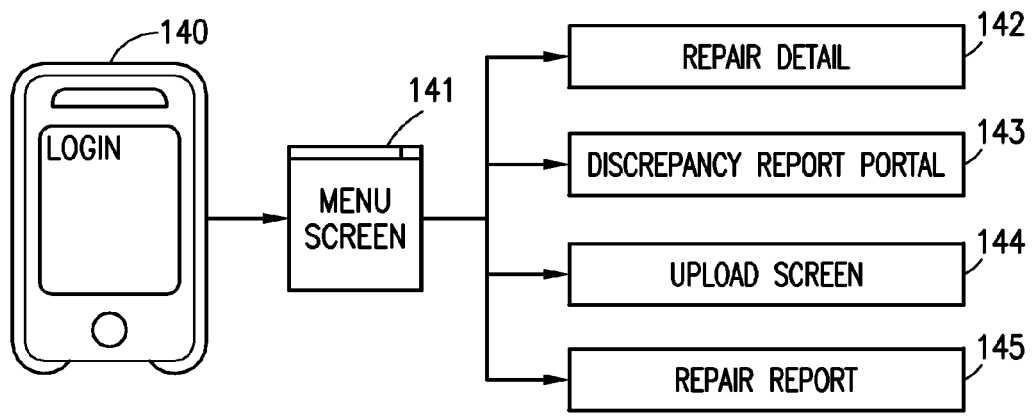
FIG. 13 depicts an exemplary repair contractor user interface on a pocket PC accessing the present invention.

Referring now to FIG. 13, an overview of the primary menus available typically available to a contractor upon logging in to BIDS is shown. A contractor often accesses BIDS onsite though a mobile device 140. The menu screen 141 after valid login credentials are provided will have direct links to repair details 142, discrepancy reports 143, an upload screen 144, and repair reports 145. The upload screen 144 menu is provided for ease of access because, as with the inspector, the contractor is expected to upload as many photographs as possible into BIDS. This user would typically have more restricted access permission to BIDS. As stated above, the primary menus are customizable by a system administrator depending on the needs and wants of the department.

The present invention is not limited to the specific embodiments described. Many different embodiments exist without departing significantly from the scope or the spirit of the present invention. The described embodiments thus serve as examples of the present invention and are not restrictive of the scope of the invention.

What is claimed is:

1. A computer system for facilitating a bridge inspection and maintenance department's management and administration of maintenance operations over an electronic data transfer network comprising:
    at least one server connected to an electronic data transfer network, said server capable of transmitting and receiving electronic data over said electronic data transfer network;
    one or more computing devices capable of accessing electronic data on said server, inputting electronic data onto said server and receiving electronic data from said server over said electronic data transfer network;
    a relational database residing on said server, wherein said database provides a virtual structure in which a plurality of bridge inspection and maintenance department data can be stored in and retrieved from, said bridge inspection and maintenance department data including a plurality of distinct bridge inspection and maintenance department data entries;
    a database engine which configures the server to receive and automatically store bridge inspection and maintenance department data entries to said database, manipulate and organize into a plurality of data structures in said database, and provide for the access of and editing to bridge inspection and maintenance department data entries on said database, wherein said engine is embodied in one or more executable software programs residing on said server;
    a graphical user interface, wherein the graphic user interface provides at least one distinct portal from which bridge inspection and maintenance department data on said database can be accessed and through which said database engine can be actuated;
    said bridge inspection and maintenance department data including inspection data, repair data and historical data;
    said engine includes (1) an access component that assigns each user with a preset level of permission and restricts the scope of database access based on the user's specific preset permissions, (2) a storage software component that provides for the receipt of bridge inspection and maintenance department data entries and assigns a unique identifier to bridge inspection and maintenance department data entries that creates an virtual association between all bridge inspection and maintenance department data entries for each bridge in the database, (3) and a retrieval component that, upon the entry of a valid unique identifier for a specific bridge inspection and maintenance department data entry, causes the graphical user interface to display information from the bridge inspection and maintenance department data entry corresponding with the unique identifier entered as well as generate a list of bridge inspection and maintenance department data entries pertaining to the same bridge;
    wherein the access component utilizes at least two predetermined permission levels to restrict access to the database;
    wherein the access component restricts access to the database based on an administrator, inspector, contractor, and engineer permission level;
    wherein said repair data comprises damage assessment data, repair schedule data, repair detail data, pre-repair evaluation data, repair status data, and post repair report data;
    wherein said historical data comprises environmental data, load rating data, DOT report data, archived inspection report data, archived damage assessment data, archived repair reports data, and archived post repair reports data;
    wherein said inspection data comprises incident inspection data, automatic inspection data, inspection report data, and inspection media data;
    wherein damage assessment data entries are automatically generated upon the input of inspection report data entry containing a deficiency report into the database; and
    wherein inspection report data entries that cause the generation of damage assessment data entries are automatically associated with the specific damage assessment data entry caused to be generated by the inspection report data entry to be associated.

2. A computer system for facilitating a bridge department's management and administration of maintenance operations over an electronic data transfer network comprising:
    at least one server connected to an electronic data transfer network, said server capable of transmitting and receiving electronic data over said electronic data transfer network;
    one or more computing devices capable of accessing electronic data on said server, inputting electronic data onto said server and receiving electronic data from said server over said electronic data transfer network;
    a relational database residing on said server, wherein said database provides a virtual structure in which a plurality of bridge inspection and maintenance department data can be stored in and retrieved from, said bridge inspection and maintenance department data including a plurality of distinct bridge inspection and maintenance department data entries;

a database engine which configures the server to receive and automatically store bridge inspection and maintenance department data entries to said database, manipulate and organize into a plurality of data structures in said database, and provide for the access of and editing to bridge inspection and maintenance department data entries on said database, wherein said engine is embodied in one or more executable software programs residing on said server a graphical user interface, wherein the graphic user interface provides at least one distinct portal from which bridge inspection and maintenance department data on said database can be accessed and through which said database engine can be actuated;

said bridge inspection and maintenance department data including inspection data, repair data and historical data;

said engine includes (1) an access component that assigns each user with a preset level of permission and restricts the scope of database access based on the user's specific preset permissions, (2) a storage software component that provides for the receipt of bridge inspection and maintenance department data entries and assigns a unique identifier to bridge inspection and maintenance department data entries that creates an virtual association between all bridge inspection and maintenance department data entries for each bridge in the database, (3) and a retrieval component that, upon the entry of a valid unique identifier for a specific bridge inspection and maintenance department data entry, causes the graphical user interface to display information from the bridge inspection and maintenance department data entry corresponding with the unique identifier entered as well as generate a list of bridge inspection and maintenance department data entries pertaining to the same bridge;

wherein the access component restricts the scope of access to the database based on an administrator, inspector, contractor, and engineer permission level;

wherein said repair data comprises damage assessment data, repair schedule data, repair detail data, pre-repair evaluation data, repair status data, and post repair report data;

wherein said historical data comprises environmental data, load rating data, DOT report data, archived inspection report data, archived damage assessment data, archived repair reports data, and archived post repair reports data;

wherein said inspection data comprises incident inspection data, automatic inspection data, inspection report data, and inspection media data;

wherein damage assessment data entries are automatically generated upon the input of inspection report data entry containing a deficiency report into the database; and wherein inspection report data entries that cause the generation of damage assessment data entries are automatically associated with the specific damage assessment data entry caused to be generated by the inspection report data entry to be associated.

3. A method for facilitating the management of a bridge maintenance department's management and administration of maintenance operations over an electronic data transfer network comprising the steps of:

providing at least one server connected to an electronic data transfer network, said server capable of transmitting and receiving electronic data over said electronic data transfer network;

providing one or more computing devices capable of accessing electronic data on said server, inputting electronic data onto said server and receiving electronic data from said server over said electronic data transfer network;

providing a relational database residing on said server, wherein said database provides a virtual structure in which a plurality of bridge inspection and maintenance department data can be stored in and retrieved from, said bridge inspection and maintenance department data including a plurality of distinct bridge inspection and maintenance department data entries;

configuring the server to automatically receive and store bridge inspection and maintenance department data entries to said database, manipulate and organize into a plurality of data structures in said database, and provide for the access of and editing to bridge inspection and maintenance department data entries on said database with a database engine embodied in one or more executable software programs residing on said server, wherein said bridge inspection and maintenance department data includes including inspection data, repair data and historical data;

providing a graphical user interface, wherein the graphic user interface provides at least one distinct portal from which bridge inspection and maintenance department data on said database can be accessed and through which said database engine can be actuated;

providing for the receipt of bridge inspection and maintenance department data entries; associating a unique identifier to each bridge inspection and maintenance department data entry, wherein the input of the identifier by one of said computing devices causes the engine to output the bridge inspection and maintenance department data entry associated with said identifier and output on said computing device; and requiring the computing devices input an access credential into said engine and have the access credential accepted by the engine before said computing devices can access the database, wherein each access credential has a preset scope of access such that the access credentials input by the computing device determines the scope of access to the database the engine allows;

wherein said engine associates all acceptable access credentials with one of at least two distinct preset permission levels;

wherein said engine associates all acceptable access credentials with an administrator, inspector, contractor, or engineer permission level;

wherein said bridge inspection and maintenance department data including inspection data, repair data and historical data;

wherein said repair data comprises damage assessment data, repair schedule data, repair detail data, pre-repair evaluation data, repair status data, and post repair report data;

wherein said historical data comprises environmental data, load rating data, DOT report data, archived inspection report data, archived damage assessment data, archived repair reports data, and archived post repair reports data;

wherein said inspection data comprises incident inspection data, automatic inspection data, inspection report data, and inspection media data;

automatically generating damage assessment data entries upon the input of any inspection report data entry containing a deficiency report into the database; and automatically associating inspection report data entries that cause the generation of damage assessment data entries with the specific damage assessment data entry caused to be generated by the inspection report data entry to be associated.

* * * * *